United States Patent
Zhang et al.

(10) Patent No.: US 11,061,518 B2
(45) Date of Patent: Jul. 13, 2021

(54) TOUCH SUBSTRATE AND MANUFACTURING METHOD THEREOF, TOUCH DISPLAY PANEL

(71) Applicants: BOE Technology Group Co., Ltd., Beijing (CN); HEFEI XINSHENG OPTOELECTRONICS TECHNOLOGY CO., LTD., Anhui (CN)

(72) Inventors: Xujie Zhang, Beijing (CN); Tsungchieh Kuo, Beijing (CN); Ming Zhang, Beijing (CN); Jian Tian, Beijing (CN); Shifeng Xu, Beijing (CN); Chunjian Liu, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

(*) Notice: Subject to any disclaimer, the term of this patent is extended or adjusted under 35 U.S.C. 154(b) by 327 days.

(21) Appl. No.: 16/081,253

(22) PCT Filed: Jan. 11, 2018

(86) PCT No.: PCT/CN2018/072182
§ 371 (c)(1),
(2) Date: Aug. 30, 2018

(87) PCT Pub. No.: WO2018/192281
PCT Pub. Date: Oct. 25, 2018

(65) Prior Publication Data
US 2020/0333916 A1    Oct. 22, 2020

(30) Foreign Application Priority Data

Apr. 21, 2017   (CN) .......................... 201710266132.2

(51) Int. Cl.
*G06F 3/044*    (2006.01)

(52) U.S. Cl.
CPC .. *G06F 3/0445* (2019.05); *G06F 2203/04103* (2013.01); *G06F 2203/04107* (2013.01); *G06F 2203/04111* (2013.01)

(58) Field of Classification Search
CPC .................................................... G06F 3/0445
See application file for complete search history.

(56) References Cited

U.S. PATENT DOCUMENTS

| | | | |
|---|---|---|---|
| 2011/0193801 A1* | 8/2011 | Jung ...................... | G06F 3/0412 345/173 |
| 2016/0252996 A1 | 9/2016 | Jiang | |

(Continued)

FOREIGN PATENT DOCUMENTS

| | | |
|---|---|---|
| CN | 102135676 | 7/2011 |
| CN | 102455831 | 5/2012 |

(Continued)

OTHER PUBLICATIONS

International Search Report and Written Opinion of the International Searching Authority for corresponding PCT Application No. PCT/CN2018/072182 (Foreign Text, 10 pages; English Translation, 5 pages) (dated Apr. 17, 2018).

(Continued)

*Primary Examiner* — Gustavo Polo
(74) *Attorney, Agent, or Firm* — Myers Bigel, P.A.

(57) ABSTRACT

Embodiments of the present disclosure describe a touch substrate and its manufacturing method and a touch display panel. The touch substrate includes a base substrate, a touch electrode layer arranged above the base substrate and includes a plurality of first touch electrodes and a plurality of second touch electrodes, each of the first touch electrodes and each of the corresponding second touch electrodes (Continued)

forming a mutual capacitance, a first insulating layer arranged above the touch electrode layer, a first via hole located in the first insulating layer, and a signal wiring arranged above the first insulating layer and connected to a corresponding one of the first touch electrodes and the second touch electrodes through the first via hole.

20 Claims, 6 Drawing Sheets

(56) References Cited

U.S. PATENT DOCUMENTS

| | | | |
|---|---|---|---|
| 2018/0032193 A1 | 2/2018 | Qu | |
| 2019/0056815 A1 | 2/2019 | Fan et al. | |

FOREIGN PATENT DOCUMENTS

| | | |
|---|---|---|
| CN | 202472596 | 10/2012 |
| CN | 104199586 | 12/2014 |
| CN | 204965393 | 1/2016 |
| CN | 106020531 | 10/2016 |
| CN | 106227386 | 12/2016 |
| CN | 107092393 | 8/2017 |

OTHER PUBLICATIONS

First Chinese Office Action corresponding to Chinese Patent Application No. 201710266132.2, dated Feb. 27, 2019. (33 pages with English translation).

\* cited by examiner

TOUCH SUBSTRATE AND MANUFACTURING METHOD THEREOF, TOUCH DISPLAY PANEL

CROSS REFERENCE TO RELATED APPLICATIONS

The present application is a 35 U.S.C. 371 national stage application of PCT International Application No. PCT/CN2018/072182, filed on Jan. 11, 2018, which claims the priority of Chinese patent application No. 201710266132.2, filed on Apr. 21, 2017, the disclosures of which are hereby incorporated in their entireties by reference.

TECHNICAL FIELD

The present disclosure relates to the technical field of display technologies, in particular to a touch substrate and its manufacturing method and a touch display panel.

BACKGROUND

As users are requiring better experiences for touch display devices, the design of no-blind-spot and frameless touch display panel has become the subject of intense research today in the touch display field.

In related art, there are still some technical difficulties in realizing a touch display panel that has no blind spot and that is frameless as well.

SUMMARY

According to a first aspect of the present disclosure, a touch substrate is provided, which includes a base substrate, a touch electrode layer arranged above the base substrate and including a plurality of first touch electrodes and a plurality of second touch electrodes, each of the first touch electrodes and each of the corresponding second touch electrodes forming a mutual capacitance, a first insulating layer arranged above the touch electrode layer, a first via hole located in the first insulating layer, and a signal wiring arranged above the first insulating layer and connected to a corresponding one of the first touch electrodes and the second touch electrodes through the first via hole.

Alternatively, a shield layer and a second insulating layer are arranged between the first insulating layer and the signal wiring. The shield layer is arranged above the first insulating layer, and an orthographic projection of the shield layer on the base substrate does not overlap an orthographic projection of the first via hole on the base substrate. The second insulating layer is arranged above the shield layer, and a second via hole is provided on the second insulating layer at a position corresponding to the first via hole. The signal wiring is arranged above the second insulating layer, and is connected to a corresponding one of the first touch electrodes and second touch electrodes through the second via hole and the first via hole.

Alternatively, the material of the shield layer includes a transparent conductive material. Alternatively, the transparent conductive material is indium tin oxide. Alternatively, the first touch electrodes and the second touch electrodes are arranged in the same layer.

Alternatively, the first touch electrode includes a plurality of independent electrode sub-patterns and conductive bridge lines for connecting the electrode sub-patterns, the electrode sub-patterns are arranged in the same layer as the second touch electrodes, and the conductive bridge lines are arranged in a different layer from the second touch electrodes.

Alternatively, at least one end of the first touch electrode is at an edge area of the touch substrate, and at least one end of the second touch electrode is at the edge area of the touch substrate. The first via hole is arranged corresponding to the end of the first touch electrode that is at the edge area of the touch substrate or corresponding to the end of the second touch electrode that is at the edge area of the touch substrate. Alternatively, the shield layer is in an area surrounded by the edge area of the touch substrate. Alternatively, the signal wiring has a shape of a polyline.

According to a second aspect of the present disclosure, a touch display panel is provided, which includes the above-described touch substrate. Alternatively, the touch display panel further includes a black matrix that includes a plurality of first shading strips extending along a first direction and a plurality of second shading strips extending along a second direction. The signal wiring intersects with both at least one of the first shading strips and at least one of the second shading strips. Alternatively, the first direction is the vertical direction, and the second direction is the horizontal direction. A part of the signal wiring that intersects with the first shading strip forms an included angle of 10°~20° with the vertical direction.

According to a third aspect of the present disclosure, a method for manufacturing the touch substrate is provided, which includes forming a touch electrode layer above a base substrate, the touch electrode layer including a plurality of first touch electrodes and a plurality of second touch electrodes, each of the first touch electrodes and each of the corresponding second touch electrodes forming a mutual capacitance, forming a first insulating layer above the touch electrode layer. A first via hole is arranged on the first insulating layer. Forming a signal wiring above the first insulating layer, which is connected to a corresponding one of the first touch electrodes and the second touch electrodes through the first via hole.

Alternatively, there are the following steps between the step of forming the first insulating layer above the touch electrode layer and the step of forming the signal wiring above the first insulating layer including forming a shield layer above the first insulating layer, an orthographic projection of the shield layer on the base substrate not overlapping an orthographic projection of the first via hole on the base substrate, and forming a second insulating layer above the shield layer, and providing a second via hole on the second insulating layer at a position corresponding to the first via hole, the signal wiring above the second insulating layer being connected to a corresponding one of the first touch electrodes and second touch electrodes through the second via hole and the first via hole.

Alternatively, the step of forming the touch electrode layer above the base substrate includes forming patterns of the plurality of first touch electrodes and patterns of the plurality of second touch electrodes above the base substrate through one patterning process. Alternatively, the step of forming the touch electrode layer above the base substrate includes forming electrode sub-patterns of the plurality of first touch electrodes and patterns of the plurality of second touch electrodes above the base substrate through one patterning process, forming a third insulating layer above the electrode sub-patterns and the second touch electrodes, wherein a third via holes is formed on the third insulating layer at a position corresponding to each of the electrode sub-patterns, and forming a conductive bridge line above the third insulating layer through one patterning process, the conductive bridge line being connected to a corresponding electrode sub-pattern through the third via hole.

DETAILED DESCRIPTION

In order to help those skilled in the art to better understand the technical solution of the present disclosure, a touch substrate and its manufacturing method and a touch display panel provided in the present disclosure will be described in detail below with reference to the drawings.

Figure 1:
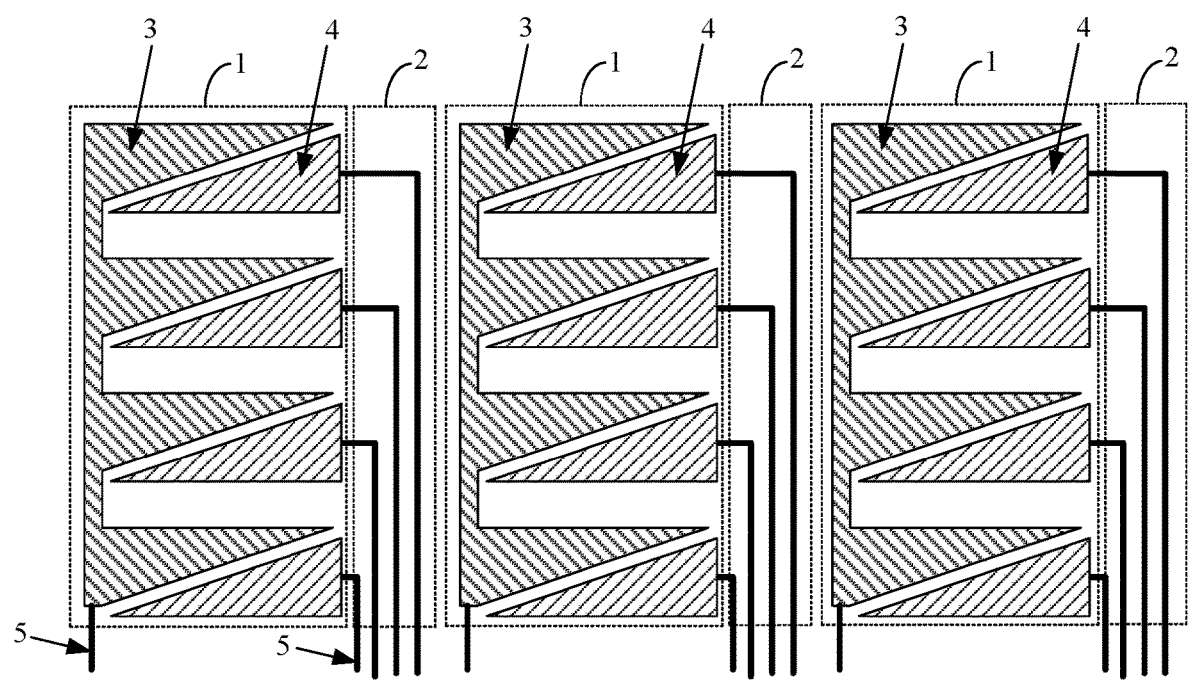
FIG. 1 is a schematic structural diagram of a single layer on-cell touch display panel in the technology known by the inventor.

FIG. 1 is a schematic structural diagram of a single layer on-cell touch display panel in the technology known by the inventor. As shown in FIG. 1, the single layer on-cell (SLOC) touch display panel comprises: touch areas 1 and signal wiring areas 2 arranged alternately, wherein each of the touch areas 1 includes a plurality of first touch electrodes 3 and a plurality of second touch electrodes 4, and mutual capacitances are generated between the first touch electrodes 3 and the second touch electrodes 4; each of the signal wiring areas 2 includes a number of signal wirings 5 connected to the corresponding first touch electrodes 3 or second touch electrodes 4, wherein the signal wirings 5 are arranged in the same layer as the first touch electrodes 3 and second touch electrodes 4, and are used for transmitting signals to the connected first touch electrodes 3 or second touch electrodes 4.

When said single layer on-cell touch substrate is used for realizing a touch resolution of M×N, the corresponding number of the signal wirings 5 is M*N+M or M*N+N at least, namely, the number of signal wirings 5 to be arranged is large, so the signal wiring area 2 is large. In this case, there is a large touch blind area (the area corresponding to the signal wiring area) on the on-cell touch substrate.

Figure 2:
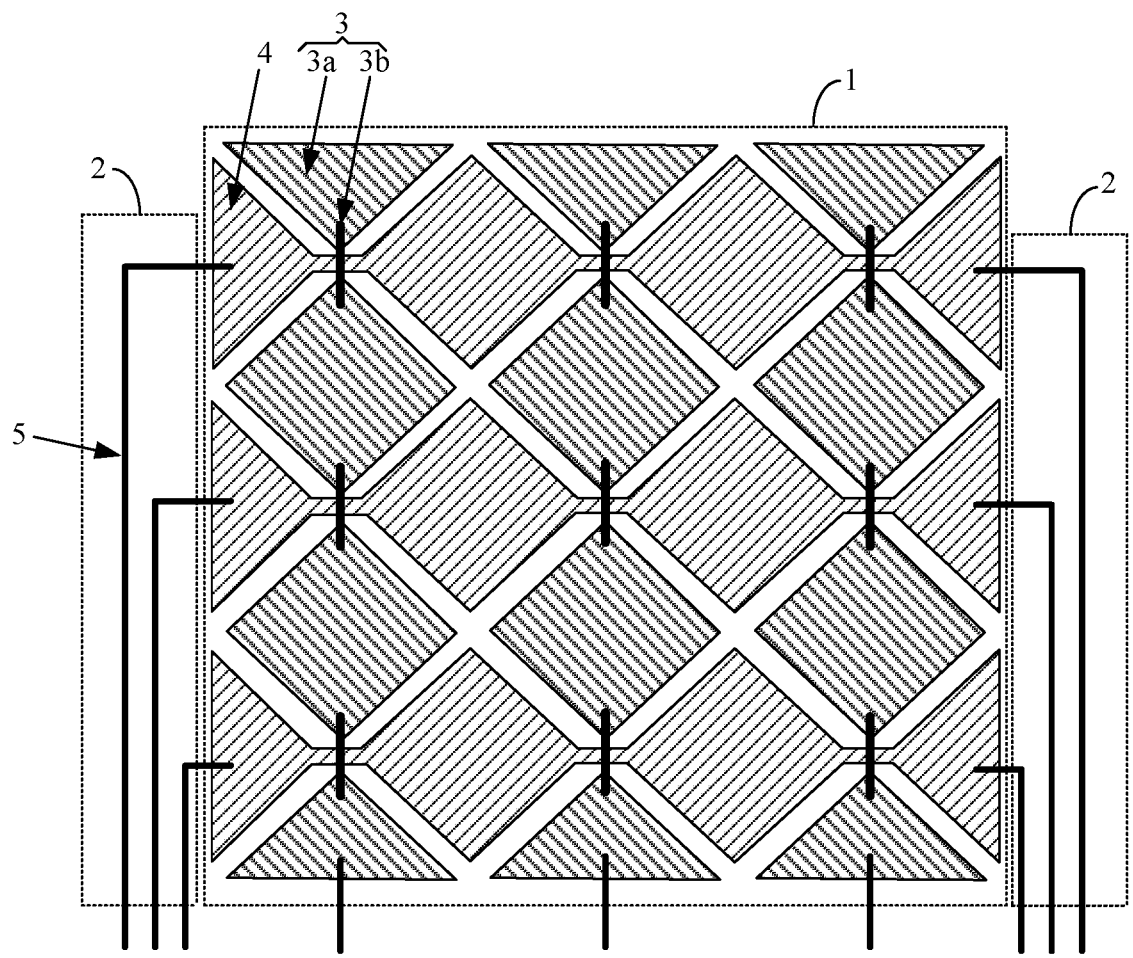
FIG. 2 is a schematic structural diagram of a multi-layer on-cell touch display panel in the technology known by the inventor.

FIG. 2 is a schematic structural diagram of a multi-layer on-cell touch display panel in the technology known by the inventor. As shown in FIG. 2, the multi-layer on-cell (MLOC) touch display panel comprises: a touch area 1 and signal wiring areas 2 in the periphery of the touch area, wherein the touch area 1 includes a plurality of first touch electrodes 3 and a plurality of second touch electrodes 4, the first touch electrode 3 each includes a plurality of electrode sub-patterns 3a and conductive bridge lines 3b connecting the respective electrode sub-patterns 3a. The conductive bridge lines 3b are arranged in a different layer from the electrode sub-patterns 3a, the electrode sub-patterns 3a and the second touch electrodes 4 are arranged in the same layer, and mutual capacitances are generated between the first touch electrodes 3 and the second touch electrodes 4. A number of signal wirings 5 connected to the corresponding first touch electrodes 3 or second touch electrodes 4 are arranged in the signal wiring area 2.

The multi-layer on-cell touch substrate can solve the problem of touch blind area, but since the signal wirings are arranged in the periphery of the panel and are non-transparent metal wirings, positions corresponding to the signal wirings need to be covered by a shading graphic layer, and there are frames at the peripheral areas of the touch display substrate. In order to reduce the sizes of the frames, widths of and spacings between the wires of the signal wirings 5 are usually reduced so as to reduce the frame width. However, in practical application, reducing the wire widths of the signal wirings will result in an increase in the resistance thereof, and serious RC delay will be caused. Besides, reduction in the wire spacings of the signal wirings 5 will cause severe crosstalk between the signal wirings. More importantly, the technical means of reducing the wire widths and wire spacings of the signal wirings 5 can only reduce the sizes of the frames to a certain extent, but it cannot effectively make the frame non-exist.

Figure 3:
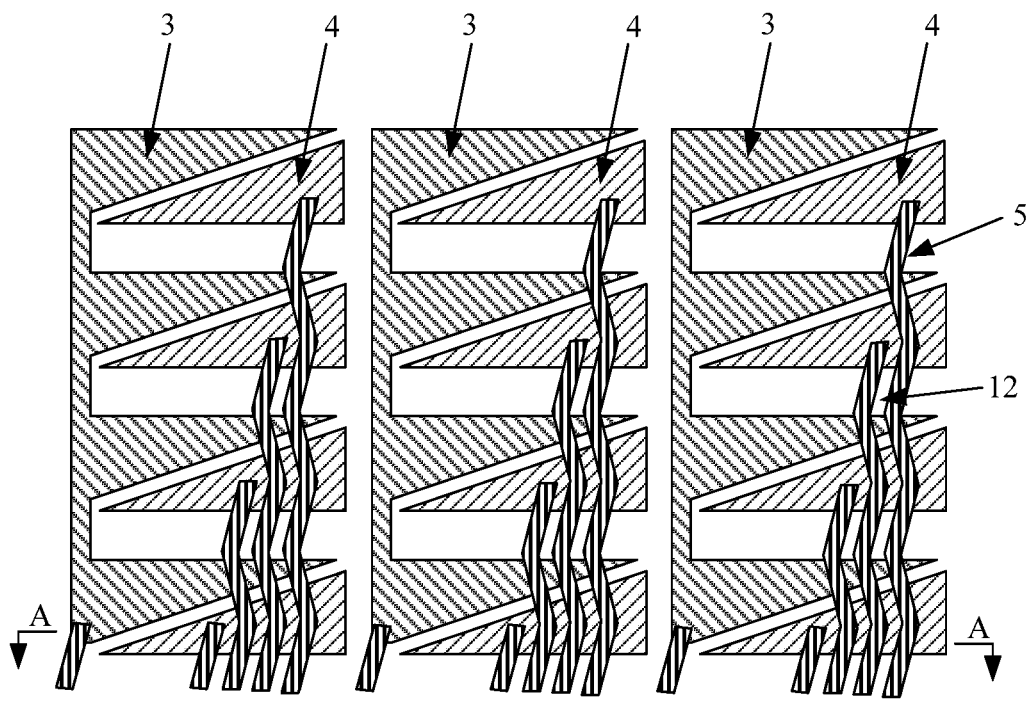
FIG. 3 is a schematic structural diagram of a touch substrate according to some embodiments of the present disclosure.
Figure 4:
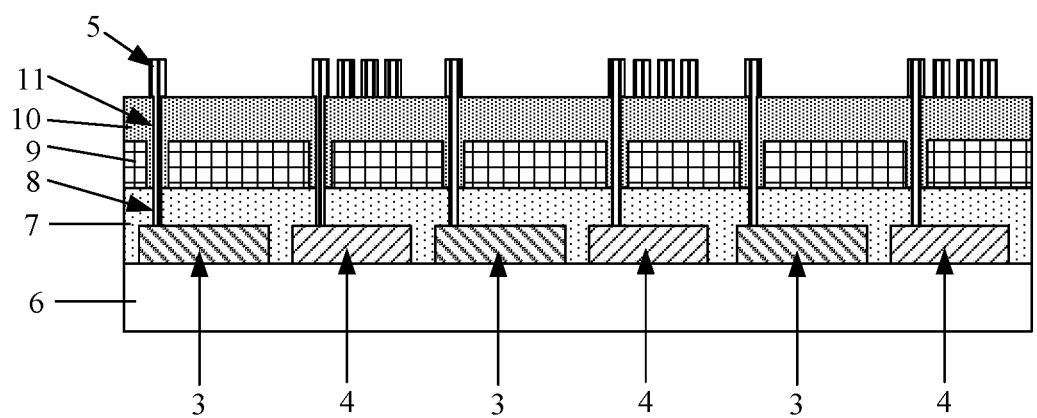
FIG. 4 is a schematic sectional view of the structure of the touch substrate of FIG. 3 along direction A-A.

FIG. 3 is a schematic structural diagram of a touch substrate according to some embodiments of the present disclosure, and FIG. 4 is a sectional view of the structure of the touch substrate of FIG. 3 along direction A-A. As shown in FIGS. 3 and 4, the touch substrate comprises: a base substrate 6 and a touch electrode layer above the base substrate 6, the touch electrode layer comprising a plurality of first touch electrodes 3 and a plurality of second touch electrodes 4, each of the first touch electrodes 3 and each of the corresponding second touch electrodes 4 forming a mutual capacitance. A first insulating layer 7 is arranged above the touch electrode layer, and a first via hole 8 is arranged on the first insulating layer 7 at a position corresponding to each of the first touch electrodes 3 and the second touch electrodes 4. A signal wiring 5 is arranged above the first insulating layer 7 and is connected to a corresponding first touch electrode 3 or a second touch electrode 4 through the first via hole 8.

It shall be noted that one of the first touch electrode 3 and the second touch electrode 4 is a touch drive electrode, and the other is a touch scan electrode. As for the process of the touch drive electrode and the touch scan electrode realizing mutual capacitive touch recognition, it will not be described in detail herein.

When combining the touch substrate provided in this embodiment with the display panel, the signal wiring 5 in the touch substrate will inevitably pass through the display area of the display panel. In order to prevent the signal wiring 5 from affecting the display effect of the display panel, the signal wiring 5 may use a transparent conductive material.

Alternatively, the material of the signal wiring 5 includes indium tin oxide (ITO).

In the technical solution in the embodiment of the present disclosure, the signal wiring 5 is arranged above the touch electrode layer, i.e. wiring in the peripheral area of the touch substrate is unnecessary, so the finally formed touch display panel can be frameless. Meanwhile, the touch electrode layer can cover the entire base substrate 6, so there is no touch blind spot on the touch substrate. It can be seen that the technical solution in the embodiment of the present disclosure can make the finally formed touch display panel frameless and have no blind spot.

In some embodiments, in order to avoid crosstalk between the signal wiring 5 and the first touch electrodes 3 and the second touch electrodes 4, a shield layer 9 and a second insulating layer 10 may also be provided between the first insulating layer 7 and the signal wiring 5, wherein the shield layer 9 is above the first insulating layer 7 and an orthographic projection of the shield layer 9 on the base substrate 6 does not overlap an orthographic projection of the first via hole 8 on the base substrate, and projections of the parts of the signal wiring 5 that are not in the first via holes 8 on the base substrate fall within an area corresponding to the shield layer 9. The second insulating layer 10 is above the shield layer 9, and a second via hole 11 is arranged on the second insulating layer 10 at a position corresponding to the first via hole 8. The signal wiring 5 is above the second insulating layer 10, and is connected to a corresponding first touch electrode 3 or second touch electrode 4 through the second via hole 11 and the first via hole 8. In the embodiment of the present disclosure, by providing a shield layer 9 between the touch electrode layer and the signal wiring 5, crosstalk between the signal wiring 5 and the touch electrodes can be avoided effectively, thus ensuring accuracy of touch recognition.

In this embodiment, the shield layer 9 can be made of a transparent conductive material.

Alternatively, the transparent conductive material comprises ITO.

It shall be noted that in this embodiment, the touch electrodes in the touch electrode layer are single layer on-cell touch electrodes. Specifically, both the first touch electrodes 3 and the second touch electrodes 4 are single layer structures and are arranged in the same layer. In this case, positions of connection between some of the first touch electrodes 3 or second touch electrodes 4 and the corresponding signal wirings 5 are in the middle area of the touch substrate, i.e. some of the first via holes 8 are in the middle area of the touch substrate.

It shall be pointed out that the specific shapes and sizes of the first touch electrodes 3 and second touch electrodes 4 in the figures are merely exemplary, and they do not limit the technical solution of the present disclosure.

In the technology known by the inventor, the signal wirings 5 of the single layer on-cell touch display panel that are on the touch substrate are straight lines and extend along the vertical direction. When parallel light beams emitted from the display panel pass through areas corresponding to the signal wirings 5, areas covered by the signal wirings 5 and areas not covered by the signal wirings 5 (i.e. gaps 12 between adjacent signal wirings 5) have different transmittance, so multi-slit interference of the light beams will occur at the gaps 12. As a result, clear strip moire effect is produced at positions of the gaps 12.

In some embodiments, in order to avoid occurrence of the moire effect, the signal wirings 5 may have the shape of a polyline, then the gaps 12 between adjacent signal wirings 5 must also be polylines, which can effectively avoid the occurrence of the strip moire effect.

Figure 5:
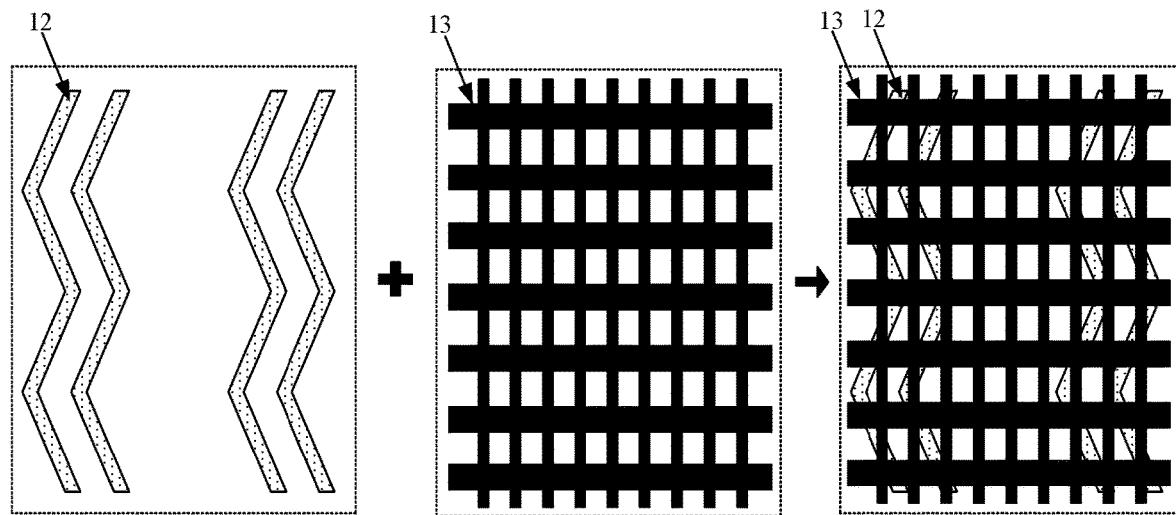
FIG. 5 is a schematic drawing of a stacking arrangement of the polyline gaps and the black matrix in the display panel.

FIG. 5 is a schematic drawing of a stacking arrangement of the polyline gaps and the black matrix in the display panel. As shown in FIG. 5, a black matrix 13 "divides" the polyline shaped gaps 12 into several parts that are relatively small in size and arranged irregularly (i.e. parts of the polyline shaped gaps 12 that are not covered by the black matrix 13). Although these parts of the gaps 12 that are not covered by the black matrix 13 still have the moire effect, since said parts are relatively small and are arranged irregularly, the strip moire effect will not occur and the moire effect are less apparent. Therefore, the technical solution in the embodiment of the present disclosure can effectively weaken the moire effect on the touch display panel, thereby ensuring a good display effect.

It shall be noted that the above example of the signal wiring 5 having a polyline shape is an optional solution of the present embodiment, but it does not limit the technical solution of the present disclosure.

Figure 6:
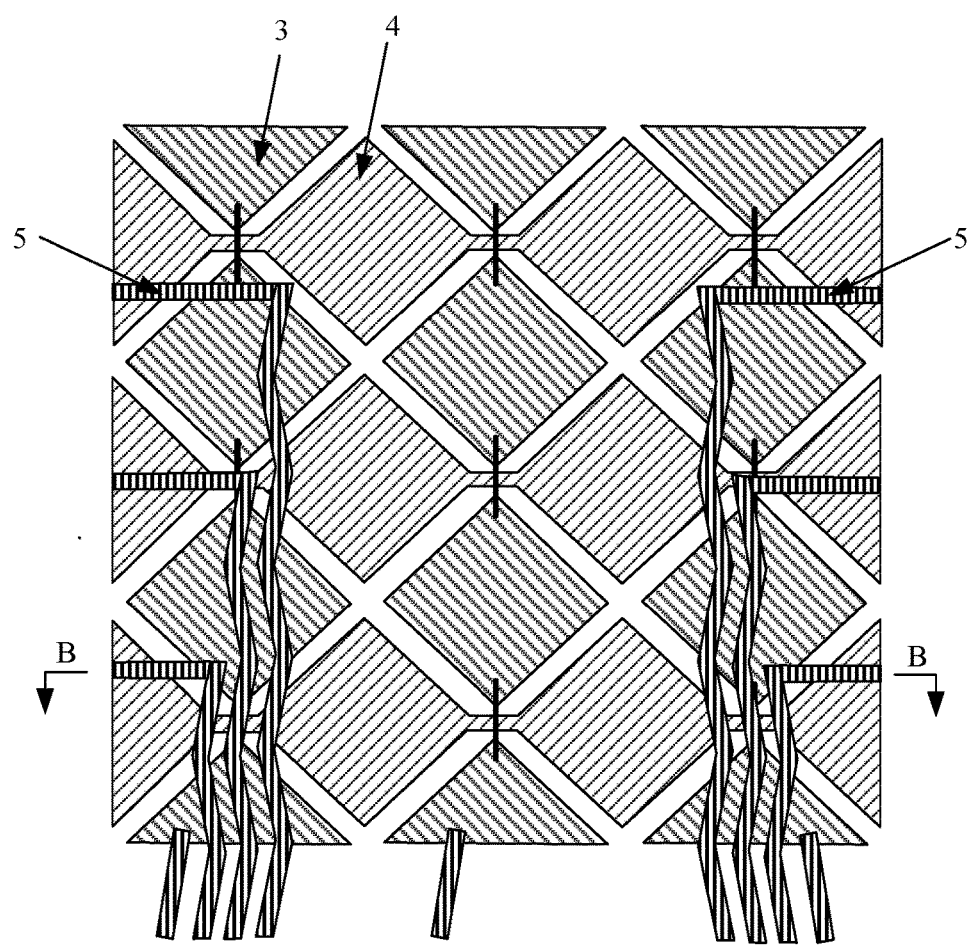
FIG. 6 is a schematic structural diagram of a touch substrate according to some embodiments of the present disclosure.
Figure 7:
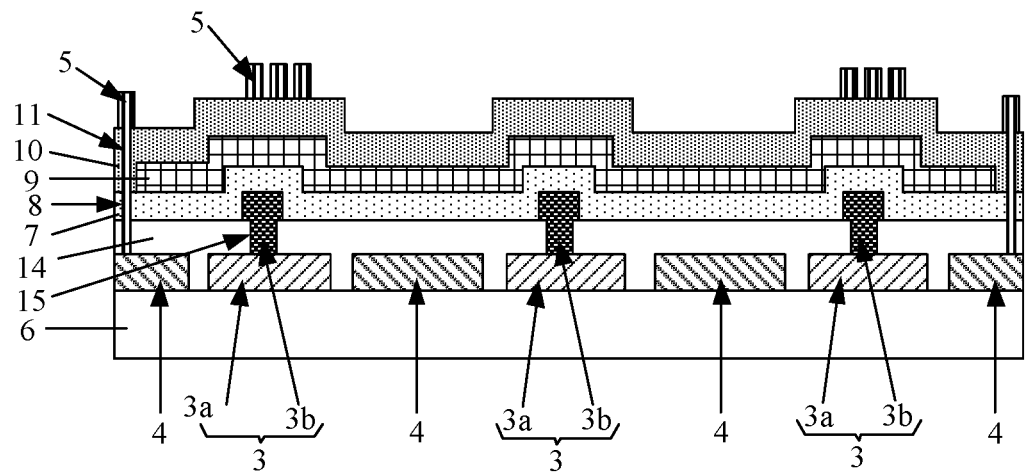
FIG. 7 is a sectional view of the structure of the touch substrate of FIG. 6 along direction B-B.

FIG. 6 is a schematic structural diagram of another touch substrate according to some embodiments of the present disclosure, and FIG. 7 is a sectional view of the structure of the touch substrate of FIG. 6 along direction B-B. As shown in FIGS. 6 and 7, unlike the single layer on-cell touch electrode structure described in the above embodiment, the touch electrodes in the touch electrode layer are multi-layer on-cell touch electrodes in the present embodiment. Specifically, each of the first touch electrodes 3 includes a plurality of independent electrode sub-patterns 3a and conductive bridge lines 3b connecting the electrode sub-patterns 3a, wherein the electrode sub-patterns 3a and the second touch electrodes 4 are arranged in the same layer, the conductive bridge lines and the second touch electrodes 4 are arranged in different layers. Specifically, a third insulating layer 14 is arranged above the electrode sub-patterns 3a and the second touch electrodes 4, and third via holes 15 are arranged on the third insulating layer 14 at positions corresponding to the electrode sub-patterns 3a, the conductive bridge lines are above the third insulating layer 14 and electrically connecting the electrode sub-patterns 3a that belong to the same first touch electrode 3 through the third via holes.

It shall be noted that the specific shapes and sizes of the first touch electrodes 3 and second touch electrodes 4 in the figures are merely exemplary, and they do not limit the technical solution of the present disclosure.

In some embodiments of the present disclosure, at least one end of the first touch electrode 3 is at an edge area of the touch substrate, and at least one end of the second touch electrode 4 is at the edge area of the touch substrate. For example, the edge area can be a ring-shape area on the touch substrate arranged along the sides of the touch substrate (which can also be called an outer ring area), and an area surrounded by the outer ring area can be called an inner ring area. The first via holes 8 are located right above ends of each of the first touch electrodes and each of the second touch electrodes 4 in the edge area, i.e. the first via holes 8 in the present embodiment are all located at the edge of the touch substrate. In the technical solution of this embodiment, by arranging all the first via holes 8 at the edge of the touch substrate, influence to the display quality of the touch display panel can be avoided effectively.

It shall be noted that in this embodiment, in the case where both ends of the second touch electrode 4 are in the edge area and are connected to the signal wirings 5, the efficiency of signal transmission between the signal wirings 5 and the second touch electrodes 4 can be effectively improved, and this is an optional solution in the present disclosure. Those skilled in the art shall understand that in the present disclosure, it is only required that each touch electrode has its corresponding signal wirings 5, but the number of the signal wirings 5 corresponding to each touch electrode is not limited.

Alternatively, the shield layer 9 is within an area surrounded by the edge area of the touch substrate.

As for descriptions about the second insulating layer 10, the shield layer 9 and the signal wiring 5 in the present embodiment, reference can be made to corresponding descriptions in any of the above embodiments.

According to some embodiments of the present disclosure, a touch display panel may also be provided, which is an on-cell touch display panel comprising a touch substrate and a display panel, the touch substrate using the touch substrate described in any one of the above embodiments.

Figure 8:
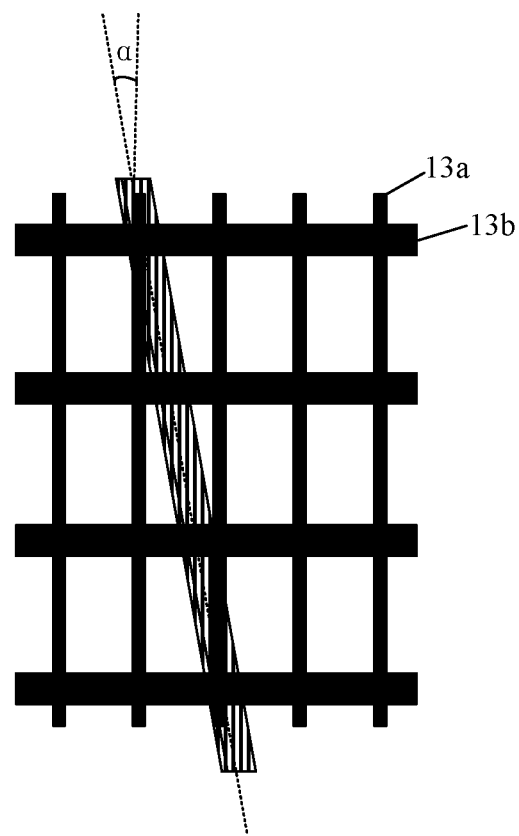
FIG. 8 is a schematic drawing of the signal wiring stacking with the black matrix in an embodiment of the present disclosure.

FIG. 8 is a schematic drawing of a signal wiring stacking with the black matrix in an embodiment of the present disclosure. As shown in FIG. 8, the display panel may include the black matrix 13 that includes a plurality of first shading strips 13a extending along a first direction and a plurality of second shading strips 13b extending along a second direction. The signal wiring 5 intersects with both at least one of the first shading strips 13a and at least one of the second shading strips 13b, i.e. the signal wiring 5 is not a straight line parallel to the first direction or the second direction (at least parts of the signal wiring 5 are tilted). Thus the gaps 12 between adjacent signal wirings 5 will also intersect with both at least one of the first shading strips 13a and at least one of the second shading strips 13b (at least parts of the gaps 12 are tilted). The first shading strips and the second shading strips "divide" the gaps 12 into a plurality of parts that are relatively small in size and are arranged irregularly.

In some embodiments, the first direction can be the vertical direction and the second direction can be the horizontal direction, an included angle α between a part on the signal wiring 5 that intersects with the first shading strip and the vertical direction is within the range of 10°~20°. In this case, while eliminating moire effect, the length of the signal wiring 5 can be kept as short as possible to avoid occurrence of RC delay in the signal wiring 5 (the signal wiring 5 need to be connected to a processing chip under the touch substrate, so the larger the projection of the length of the signal wiring 5 in the horizontal direction, the longer the entire length of the signal wiring 5, the higher the corresponding resistance and the more serious the RC delay).

Figure 9:
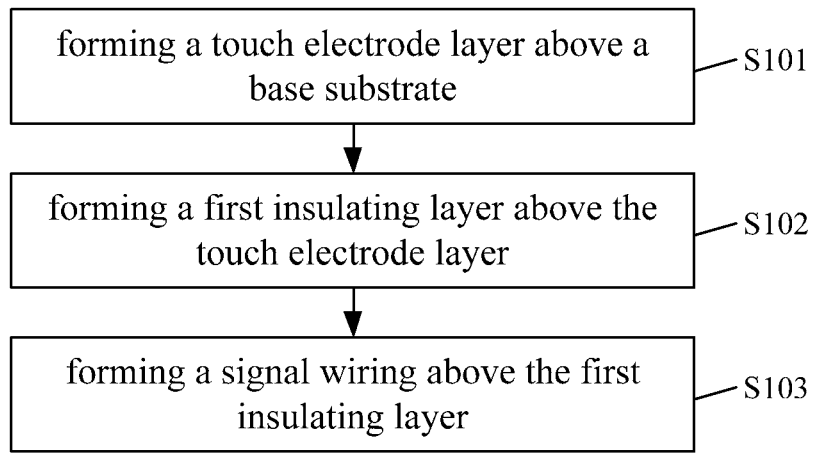
FIG. 9 is a flow chart of a method for manufacturing the touch substrate according to some embodiments of the present disclosure.

FIG. 9 is a flow chart of a method for manufacturing the touch substrate according to some embodiments of the present disclosure. As shown in FIG. 9, said manufacturing method is used for manufacturing the touch substrate described in the above embodiments, and comprises the following steps S101-S103.

At step S101, a touch electrode layer is formed above a base substrate. The touch electrode layer comprises: a plurality of first touch electrodes and a plurality of second touch electrodes, each of the first touch electrodes and each of the corresponding second touch electrodes forming a mutual capacitance.

Alternatively, step S101 may include step S1011a: forming patterns of the first touch electrodes and patterns of the second touch electrodes above the base substrate through one patterning process.

By means of step S1011a, the touch electrode layer in the above embodiment described with reference to FIG. 3 can be made, for example.

It shall be noted that the patterning process in the present disclosure includes photoresist coating, exposing, developing, etching, photoresist peeling, etc.

Alternatively, step S101 may further include:

step S1011b: forming electrode sub-patterns of the plurality of first touch electrodes and patterns of the plurality of second touch electrodes above the base substrate through one patterning process;

step S1012b: forming a third insulating layer above the electrode sub-patterns of the first touch electrodes and the second touch electrodes, wherein a third via holes is formed on the third insulating layer at a position corresponding to each of the electrode sub-patterns of the first touch electrodes;

step S1013b: forming a conductive bridge line above the third insulating layer through one patterning process, wherein the conductive bridge line is connected to a corresponding electrode sub-pattern through the third via hole.

By means of step S1011b~S1013b, the touch electrode layer (e.g. multi-layer on-cell touch electrode structure) in the above embodiment described with reference to FIG. 6 can be made, for example.

At step S102: a first insulating layer is formed above the touch electrode layer, wherein a first via hole is arranged on the first insulating layer. For example, the first via hole is arranged on the first insulating layer at a position corresponding to each of the first touch electrodes and each of the second touch electrodes.

At step S103, a signal wiring is formed above the first insulating layer, which is connected to a corresponding first touch electrode or second touch electrode through the first via hole. For example, the signal wiring can be formed above the first insulating layer through one patterning process.

Figure 10:
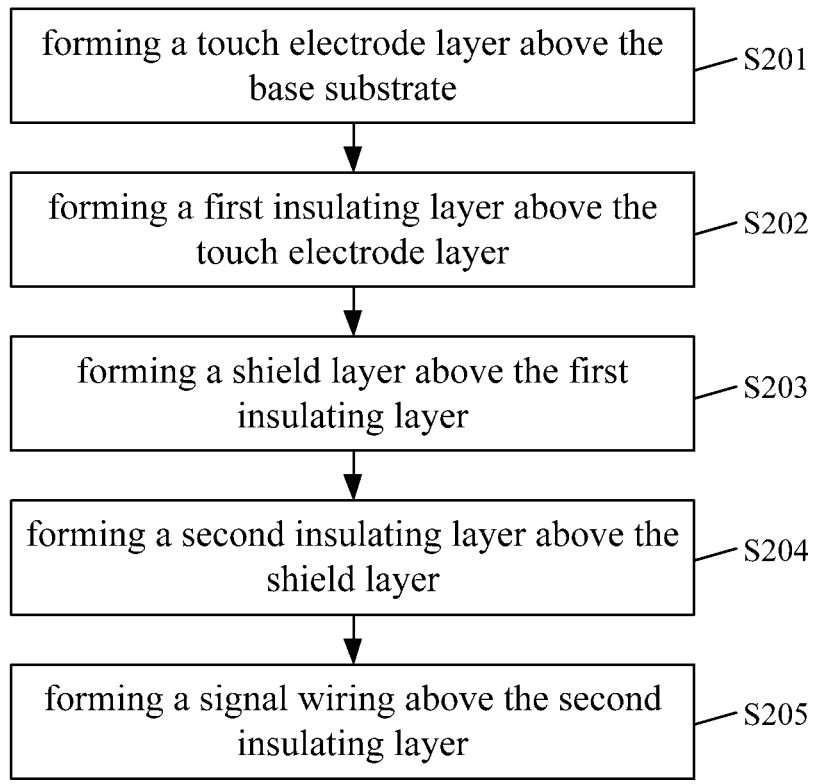
FIG. 10 is a flow chart of a method for manufacturing the touch substrate according to some embodiments of the present disclosure.

FIG. 10 is a flow chart of a method for manufacturing the touch substrate according to some embodiments of the present disclosure. As shown in FIG. 10, the manufacturing method comprises the following steps S201-S203.

At step S201, a touch electrode layer is formed above the base substrate. The touch electrode layer comprises a plurality of first touch electrodes and a plurality of second touch electrodes, each of the first touch electrodes and a corresponding one of the second touch electrodes forming a mutual capacitance.

As for descriptions about step S201, reference can be made to the descriptions of step S101 in the above embodiment.

At step S202, a first insulating layer is formed above the touch electrode layer, wherein a first via hole is arranged on the first insulating layer at a position corresponding to each of the first touch electrodes and each of the second touch electrodes.

At step S203, a shield layer is formed above the first insulating layer, wherein an orthographic projection of the shield layer on the base substrate does not overlap an orthographic projection of the first via hole on the base substrate, and projections, on the base substrate, of the parts of the subsequently made signal wiring that are not in the first via hole fall within an area corresponding to the shield layer.

At step S204, a second insulating layer is formed above the shield layer, wherein a second via hole is arranged on the second insulating layer at a position corresponding to the first via hole.

At step S205, a signal wiring is formed above the second insulating layer. For example, the signal wiring is formed above the second insulating layer through one patterning process, and the signal wiring above the second insulating layer is connected to a corresponding first touch electrode or second touch electrode through the second via hole and the first via hole.

It shall be appreciated that the above embodiments are merely exemplary embodiments given for illustrating the principle of the present disclosure, but the present disclosure is not limited to them. To those ordinarily skilled in the art, various modifications and improvements can be made without departing from the spirit and essence of the present disclosure, so these modifications and improvements shall be deemed as falling into the protection scope of the present disclosure.

The invention claimed is:

1. A touch substrate, comprising:
    a base substrate;
    a touch electrode layer directly on the base substrate, the touch electrode layer comprising a plurality of first touch electrodes and a plurality of second touch electrodes, wherein ones of the first touch electrodes and corresponding ones of the second touch electrodes form a mutual capacitance;
    a first insulating layer on the touch electrode layer, such that the touch electrode layer is between the first insulating layer and the base substrate;
    a first via hole located in the first insulating layer; and
    a signal wiring on the first insulating layer and connected to a corresponding one of the first touch electrodes and a corresponding one of the second touch electrodes through the first via hole.

2. The touch substrate according to claim 1, further comprising:
    a shield layer; and
    a second insulating layer between the first insulating layer and the signal wiring,
    wherein the shield layer is on the first insulating layer,
    wherein an orthographic projection of the shield layer on the base substrate does not overlap an orthographic projection of the first via hole on the base substrate,
    wherein the second insulating layer is on the shield layer,
    wherein a second via hole is in the second insulating layer at a position corresponding to the first via hole, and
    wherein the signal wiring is on the second insulating layer, and is connected to a corresponding one of the first touch electrodes and a corresponding one of the second touch electrodes through the second via hole and the first via hole.

3. The touch substrate according to claim 2, wherein the shield layer comprises a transparent conductive material.

4. The touch substrate according to claim 1, wherein the first touch electrodes and the second touch electrodes are in the same layer.

5. The touch substrate according to claim 1,
    wherein one of the first touch electrodes comprises a plurality of independent electrode sub-patterns and conductive bridge lines connected to the electrode sub-patterns,
    wherein the electrode sub-patterns are in the same layer as the second touch electrodes, and
    wherein the conductive bridge lines are in a different layer from the second touch electrodes.

6. The touch substrate according to claim 2,
    wherein an end of one of the first touch electrodes is at an edge area of the touch substrate,
    wherein at least one end of one of the second touch electrodes is at the edge area of the touch substrate, and wherein the first via hole corresponds to the end of the one of the first touch electrodes that is at the edge area of the touch substrate.

7. The touch substrate according to claim 6, wherein the shield layer is in an area surrounded by the edge area of the touch substrate.

8. The touch substrate according to claim 1, wherein the signal wiring has a shape of a polyline.

9. A touch display panel, comprising the touch substrate according to claim 1.

10. The touch display panel according to claim 9, further comprising:
    a black matrix comprising a plurality of first shading strips extending along a first direction and a plurality of second shading strips extending along a second direction,
    wherein the signal wiring intersects with at least one of the first shading strips and at least one of the second shading strips.

11. The touch display panel according to claim 10,
    wherein the first direction comprises the vertical direction, and the second direction comprises the horizontal direction, and
    wherein a part of the signal wiring that intersects with the first shading strip forms an included angle between 10° to 20° with the vertical direction.

12. A method for manufacturing a touch substrate, comprising:
    forming a touch electrode layer directly on a base substrate, the touch electrode layer comprising a plurality of first touch electrodes and a plurality of second touch electrodes, wherein ones of the first touch electrodes and corresponding ones of the second touch electrodes form a mutual capacitance;
    forming a first insulating layer on the touch electrode layer such that the touch electrode layer is between the first insulating layer and the base substrate, wherein a first via hole is in the first insulating layer; and
    forming a signal wiring on the first insulating layer, wherein the signal wiring is connected to a corresponding one of the first touch electrodes and a corresponding one of the second touch electrodes through the first via hole.

13. The method according to claim 12, wherein after the forming the first insulating layer on the touch electrode layer and before the forming the signal wiring on the first insulating layer, the method further comprises:
    forming a shield layer on the first insulating layer, wherein an orthographic projection of the shield layer on the base substrate does not overlap an orthographic projection of the first via hole on the base substrate;
    forming a second insulating layer on the shield layer; and
    providing a second via hole in the second insulating layer at a position corresponding to the first via hole,
    wherein the signal wiring on the second insulating layer is connected to the corresponding one of the first touch electrodes and the corresponding one of the second touch electrodes through the second via hole and the first via hole.

14. The method according to claim 12, wherein the forming the touch electrode layer on the base substrate comprises:
    forming patterns of the plurality of first touch electrodes and patterns of the plurality of second touch electrodes on the base substrate through a first patterning process.

15. The method according to claim 12, wherein the forming the touch electrode layer on the base substrate comprises:
- forming electrode sub-patterns of the plurality of first touch electrodes and patterns of the plurality of second touch electrodes on the base substrate through a second patterning process;
- forming a third insulating layer on the electrode sub-patterns and the second touch electrodes, wherein third via holes are formed in the third insulating layer at positions corresponding to ones of the electrode sub-patterns; and
- forming a conductive bridge line on the third insulating layer through a third patterning process,
- wherein the conductive bridge line is connected to a corresponding electrode sub-pattern of the electrode sub-patterns through the third via hole.

16. The touch substrate according to claim 1,
- wherein an end of one of the first touch electrodes is at an edge area of the touch substrate,
- wherein at least one end of one of the second touch electrodes is at the edge area of the touch substrate, and
- wherein the first via hole corresponds to the end of the one of the first touch electrodes that is at the edge area of the touch substrate.

17. The touch display panel according to claim 9, further comprising:
- a shield layer; and
- a second insulating layer between the first insulating layer and the signal wiring,
- wherein the shield layer is on the first insulating layer,
- wherein an orthographic projection of the shield layer on the base substrate does not overlap an orthographic projection of the first via hole on the base substrate,
- wherein the second insulating layer is on the shield layer,
- wherein a second via hole is in the second insulating layer at a position corresponding to the first via hole, and
- wherein the signal wiring is on the second insulating layer, and is connected to a corresponding one of the first touch electrodes and a corresponding one of the second touch electrodes through the second via hole and the first via hole.

18. The touch display panel according to claim 17, wherein the shield layer comprises a transparent conductive material.

19. The touch display panel according to claim 9, wherein the first touch electrodes and the second touch electrodes are in the same layer.

20. The touch display panel according to claim 9,
- wherein one of the first touch electrodes comprises a plurality of independent electrode sub-patterns and conductive bridge lines connected to the electrode sub-patterns,
- wherein the electrode sub-patterns are in the same layer as the second touch electrodes, and
- wherein the conductive bridge lines are in a different layer from the second touch electrodes.

* * * * *